United States Patent
Belz et al.

(10) Patent No.: US 10,225,618 B2
(45) Date of Patent: *Mar. 5, 2019

(54) METHOD AND SYSTEM FOR PROVIDING COMMUNICATION SERVICES

(71) Applicant: AT&T Intellectual Property I, L.P., Atlanta, GA (US)

(72) Inventors: Steven M. Belz, Sunnyvale, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,607

(22) Filed: Mar. 15, 2018

(65) Prior Publication Data

US 2018/0205997 A1 Jul. 19, 2018

Related U.S. Application Data

(63) Continuation of application No. 14/949,400, filed on Nov. 23, 2015, now Pat. No. 9,955,223, which is a (Continued)

(51) Int. Cl.
*H04N 21/4788* (2011.01)
*H04M 1/725* (2006.01)
(Continued)

(52) U.S. Cl.
CPC ..... *H04N 21/4788* (2013.01); *H04L 65/1016* (2013.01); *H04L 65/1069* (2013.01); *H04L 65/4084* (2013.01); *H04L 67/28* (2013.01); *H04M 1/725* (2013.01); *H04N 21/4126* (2013.01); *H04N 21/4131* (2013.01); *H04N 21/43615* (2013.01); *H04N 21/43637* (2013.01)

(58) Field of Classification Search
CPC .......... H04N 21/4788; H04N 21/4126; H04N 21/43637; H04N 21/43615; H04N 21/4131; H04N 21/6181; H04N 7/17318; H04N 21/6118; H04N 21/6168; H04M 1/725; H04M 1/2745; H04M 1/72533; H04L 65/1069; H04L 67/28; H04L 65/1016; H04L 65/4084; H04Q 2213/13096; H04Q 2213/13196
See application file for complete search history.

(56) References Cited

U.S. PATENT DOCUMENTS 6,452,923 B1 * 9/2002 Gerszberg .......... H04N 21/2143
370/352
7,793,305 B2 9/2010 O'Neil
(Continued)

*Primary Examiner* — Benjamin R Bruckart
*Assistant Examiner* — Tien M Nguyen
(74) *Attorney, Agent, or Firm* — Guntin & Gust, PLC; Joseph Hrutka

(57) ABSTRACT

A system that incorporates teachings of the present disclosure may include, for example, a device including a base station communicatively coupled to a communication system, and a communicative device communicatively coupled to the base station for providing voice communication services to a user, wherein the communicative device serves as a proxy to make telephone calls on behalf of a set-top box presenting media services to a presentation device. Other embodiments are disclosed.

20 Claims, 7 Drawing Sheets

Related U.S. Application Data continuation of application No. 12/501,229, filed on Jul. 10, 2009, now Pat. No. 9,225,750.

(51) Int. Cl.
  *H04L 29/06* (2006.01)
  *H04L 29/08* (2006.01)
  *H04N 21/41* (2011.01)
  *H04N 21/4363* (2011.01)
  *H04N 21/436* (2011.01)

(56) References Cited

U.S. PATENT DOCUMENTS

| | | |
|---|---|---|
| 2001/0038690 A1 | 11/2001 | Palmer et al. |
| 2001/0055951 A1* | 12/2001 | Slotznick ............. H04M 1/215 |
| | | 455/41.3 |
| 2002/0042915 A1 | 4/2002 | Kubischta |
| 2002/0052197 A1 | 5/2002 | Yuen et al. |
| 2002/0118676 A1 | 8/2002 | Tonnby |
| 2002/0149705 A1 | 10/2002 | Allen |
| 2003/0014754 A1 | 1/2003 | Chang |
| 2003/0028889 A1 | 2/2003 | McCoskey |
| 2003/0035517 A1 | 2/2003 | Kobylevsky |
| 2005/0066362 A1* | 3/2005 | Rambo .................. H04L 51/04 |
| | | 725/43 |
| 2005/0091693 A1 | 4/2005 | Armine et al. |
| 2005/0282582 A1 | 12/2005 | Slotznick |
| 2005/0285734 A1 | 12/2005 | Sheynman et al. |
| 2008/0115189 A1* | 5/2008 | Lejeune ................ H04N 7/163 |
| | | 725/141 |
| 2009/0190028 A1 | 7/2009 | Rodriguez |
| 2009/0288112 A1 | 11/2009 | Kandekar et al. |
| 2010/0115567 A1* | 5/2010 | Gupta ............... H04N 21/4131 |
| | | 725/106 |

* cited by examiner

200

METHOD AND SYSTEM FOR PROVIDING COMMUNICATION SERVICES

CROSS-REFERENCE TO RELATED APPLICATIONS

This application is a continuation of and claims priority to U.S. patent application Ser. No. 14/949,400, now U.S. Patent Pub. No. 2016/0088356, which is a continuation of and claims priority to U.S. patent application Ser. No. 12/501,229, now U.S. Pat. No. 9,225,750. The contents of each of the foregoing is/are hereby incorporated by reference into this application as if set forth herein in full.

FIELD OF THE DISCLOSURE

The present disclosure relates generally to communication techniques and more specifically to a method and system for providing communication services.

BACKGROUND

Telephony today is supplied by landline or mobile communication systems. Landline communication services generally means that a communication device is tethered to the communication system, while with mobile communication services the communication device is untethered or wireless. Mobility in this context can be short range or long range. Short range mobile communications can be supported by for example cordless phone technology such as Digital Enhanced Cordless Telecommunications, Wireless Fidelity often referred to as WiFi, or Bluetooth. Long range wireless mobile technology is generally supported by cellular communication systems.

DETAILED DESCRIPTION

One embodiment of the present disclosure can entail a device including a base station communicatively coupled to a communication system, and a communicative device communicatively coupled to the base station for providing voice communication services to a user, wherein the communicative device serves as a proxy to make telephone calls on behalf of a set-top box (STB), the STB being operative to present media services to a presentation device.

Another embodiment of the present disclosure can entail a set-top box including a controller to receive a request for voice communication services from an accessory communicatively coupled to the STB, submit a request to a communication device communicatively coupled to a base station that provides voice services to the communication device, receive the voice communication services from the communication device responsive to said request, and present a user of the STB the requested voice communication service.

Yet another embodiment of the present disclosure can entail a computer-readable storage medium operating in a first communication device including computer instructions to receive a voice communication request from an STB on a first wireless interface, submit an address book to the STB over the first wireless interface, receive from the STB over the first wireless interface a selection from the address book, initiate a voice communication session with a second communication device over a second wireless interface according to the selection received by the STB, and link the voice communication session with the STB over the first wireless interface.

Another embodiment of the present disclosure can entail receiving a request for voice communication service from a remote control device communicatively coupled to a set-top box, submitting a request to a communication device communicatively coupled to a base station that provides voice services to the communication device, receiving voice communication services from the communication device responsive to said request, and presenting a user of the STB the requested voice communication service.

Figure 1:
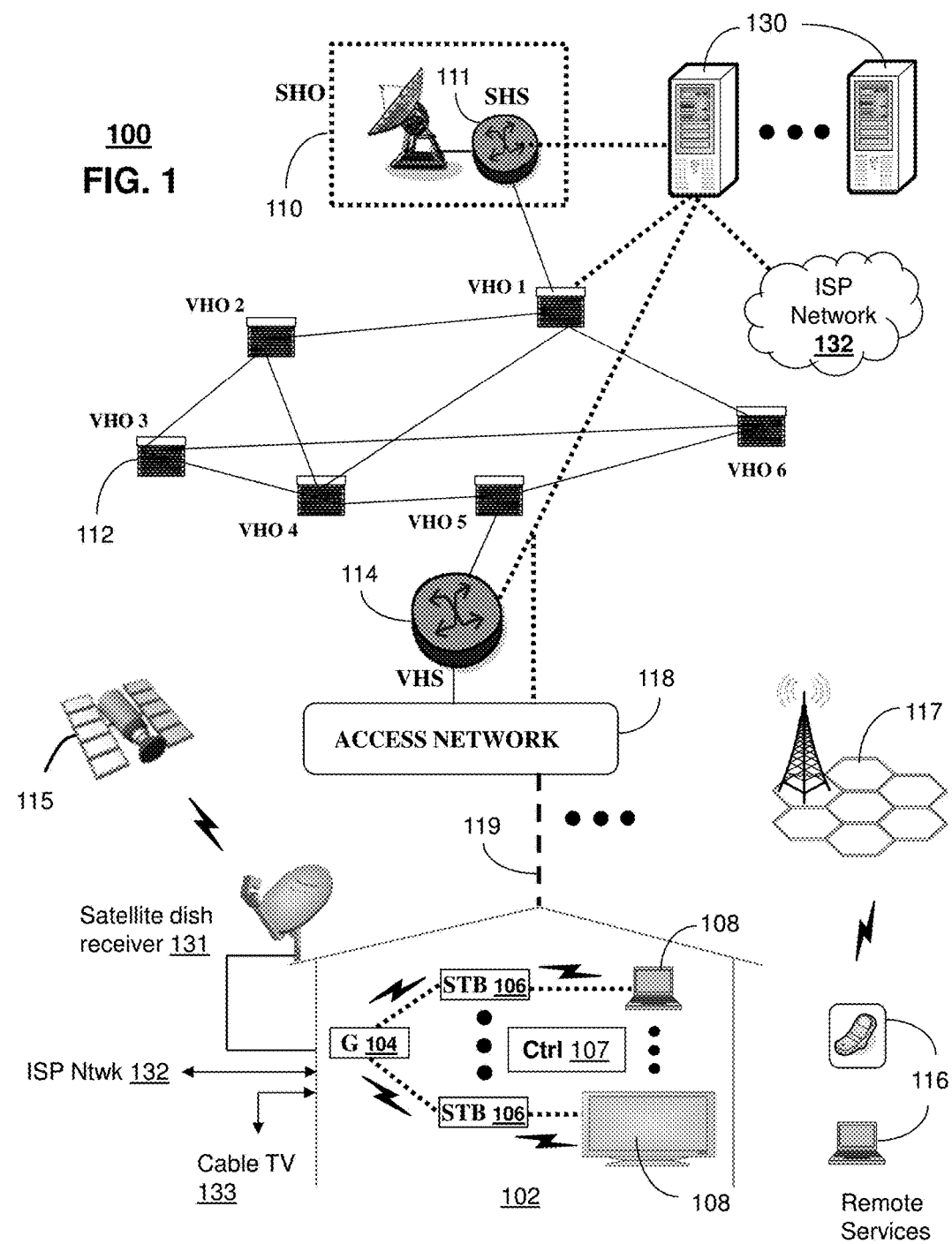
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
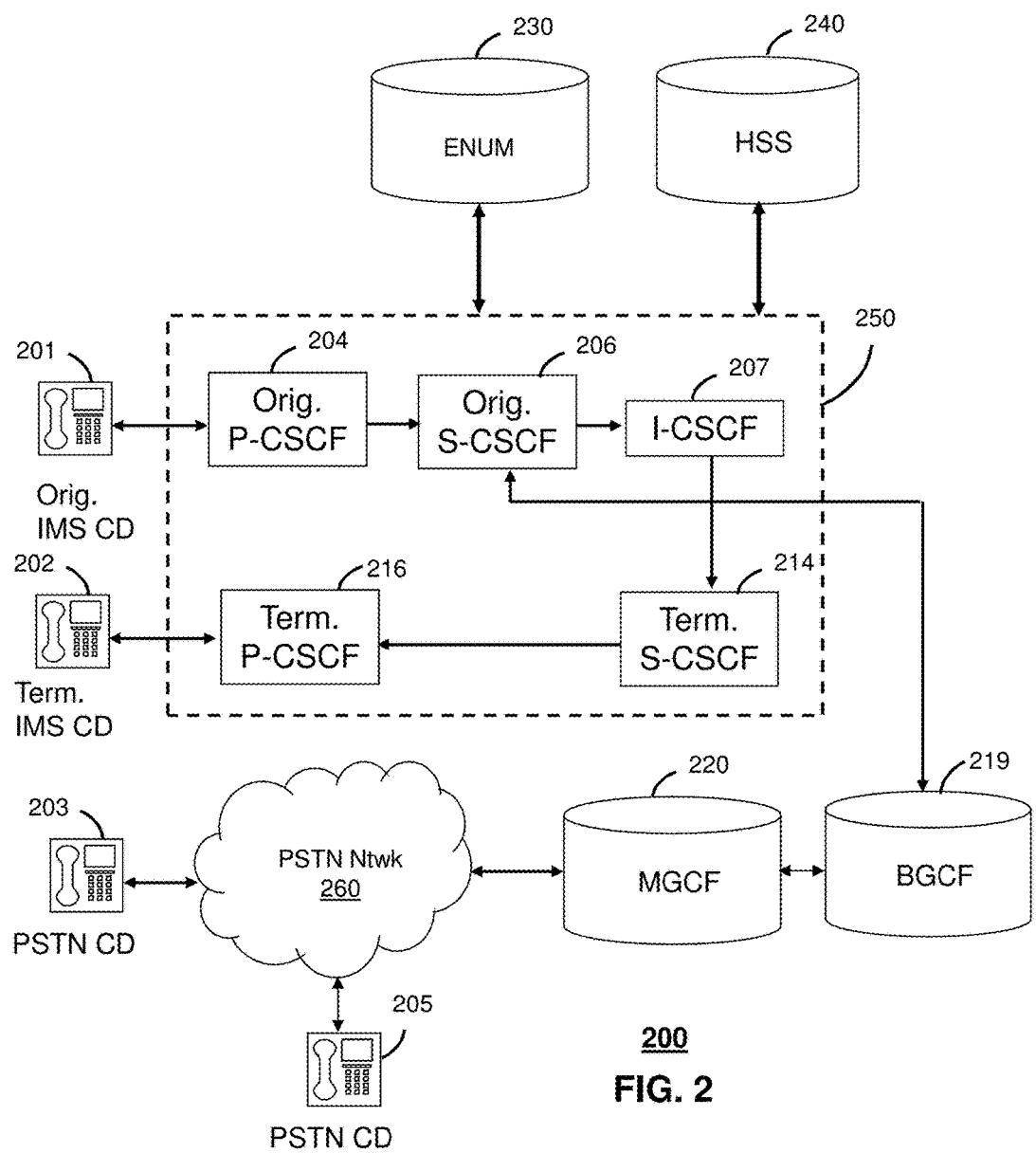

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
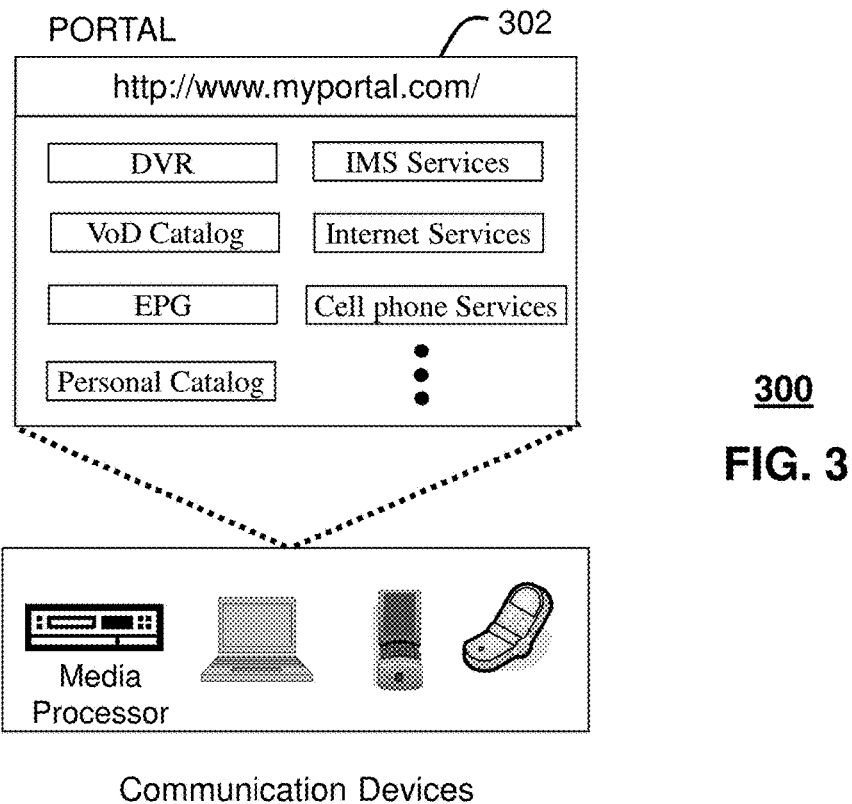
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
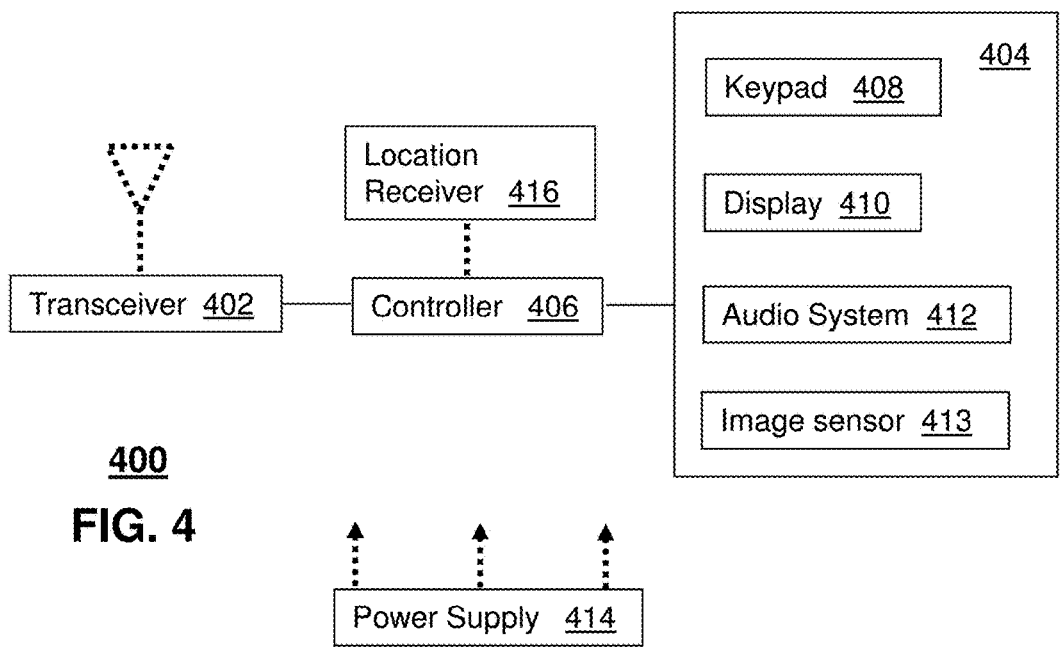
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
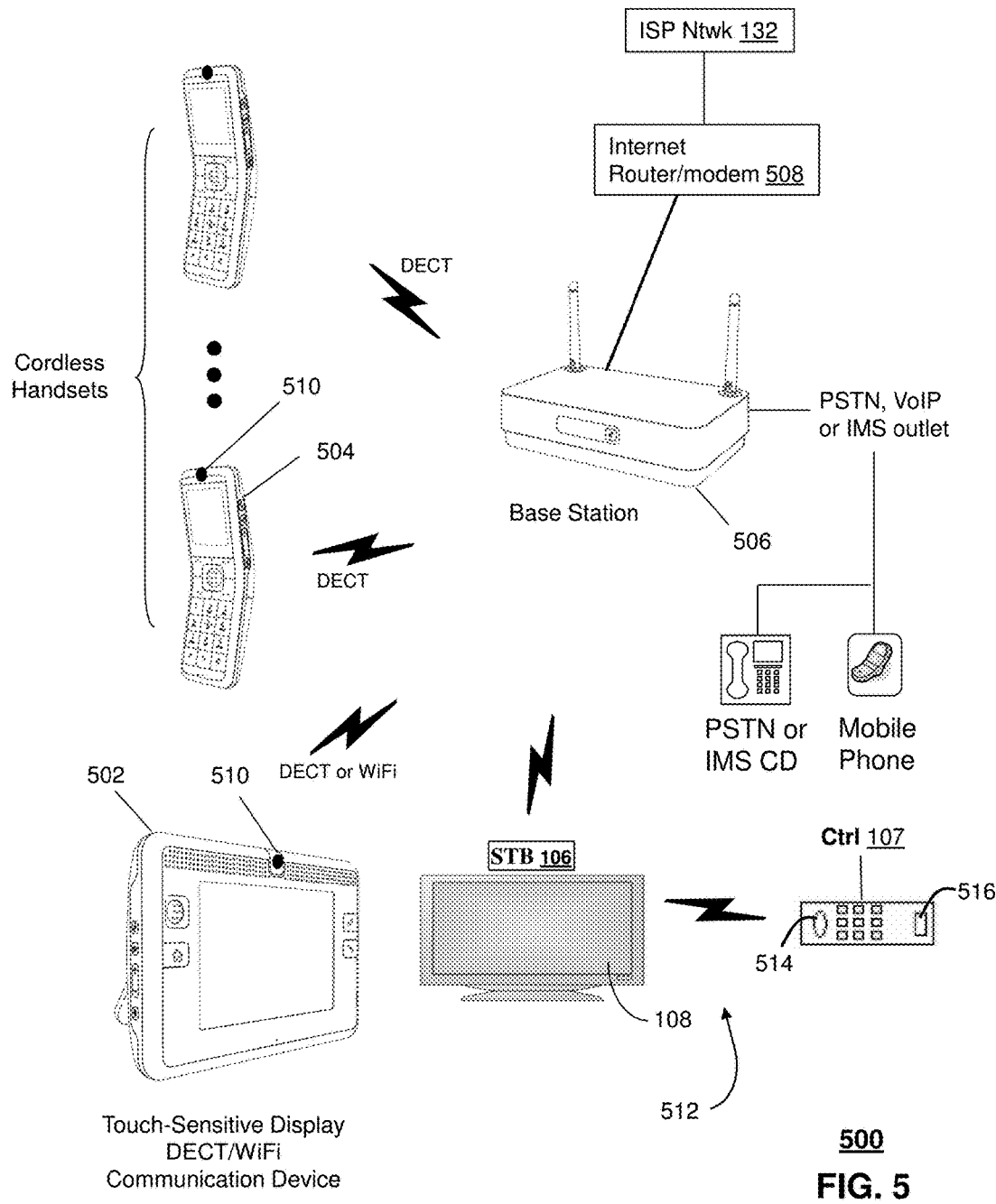
FIG. 5 depicts an illustrative embodiment of a system for integrating an entertainment and communication system.

FIG. 5 depicts an illustrative embodiment of a system 500 for integrating an entertainment and communication system, the system 500 being operable in portions of the communication systems of FIGS. 1 and 2. The system 500 can include a communication device 502 comprising a cellular phone or a landline phone. The communication device 502 may comprise, for example, a frame or a tablet with a touch-sensitive display, although not limited to such a configuration. The communication device 502 can include communication technology to support both DECT and WiFi protocols. The communication device 502 can be communicatively coupled to a base unit or base station 506 by way of DECT and WiFi air interfaces. A plurality of cordless handsets 504 can also be communicatively coupled to the base unit 506 using the DECT protocol.

The base unit 506 can include communication technology for communicatively interfacing to a PSTN, VoIP, or IMS network such as those described earlier. The base unit 506 can be coupled to a data modem such as an Internet/router modem 508 for communicatively interfacing to the ISP network 132 of FIG. 1. The base unit 506 can provide the cordless handsets 504 voice communications services, and the tablet 502 a combination of voice and data communication services. The tablet 502 and cordless handsets 504 can be equipped with common camera sensors 510 (such as CCD sensors) which can enable these devices to support video communication services and capture still images or pictures.

The base unit 506 can also be communicatively coupled in a wireless fashion to one or more of the STBs 106 which in turn present broadcast signals to media or presentation devices 108 such as computers or television sets managed by the media controller 107 which can be a handheld remote control device and/or infrared keyboard (see also FIG. 1). The STBs 106, presentation devices 108 and the media controller 107 together comprise an entertainment system 512. As will be discussed in more detail below, the communication device 502 (such as the frame or tablet) can serve as a proxy to make telephone calls on behalf of the STB 106.

Figure 6:
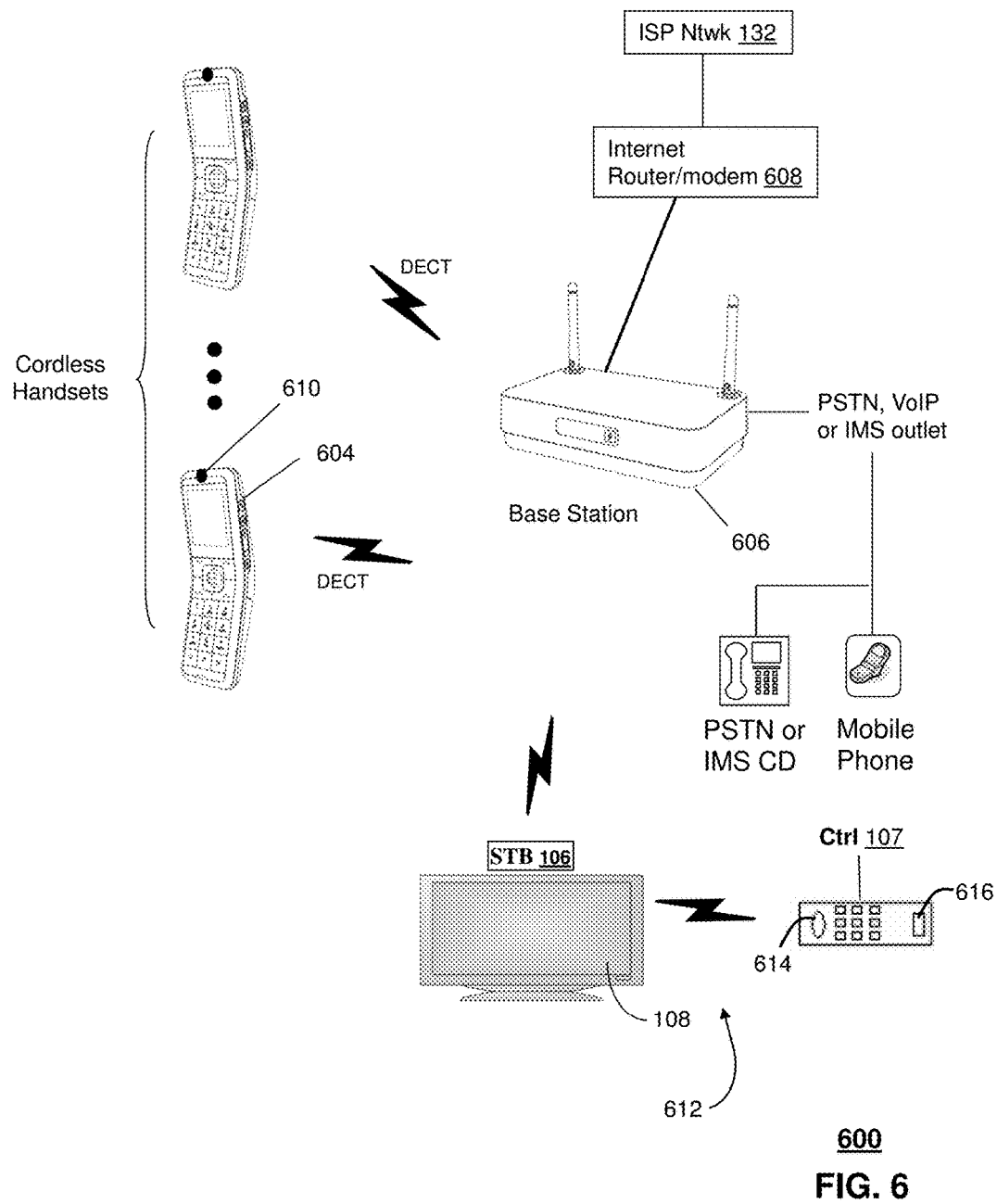
FIG. 6 depicts an alternative embodiment of the system for integrating an entertainment and communication system.

FIG. 6 discloses a system 600 similar to the system 500 but where the tablet 502 is eliminated and the base unit 606 is used as the proxy to make telephone calls on behalf of the STB 106. In the system 600, like reference numerals are used to denote like structure as in the system 500 except that the prefix "6" is used instead of "5" wherever appropriate.

Figure 7:
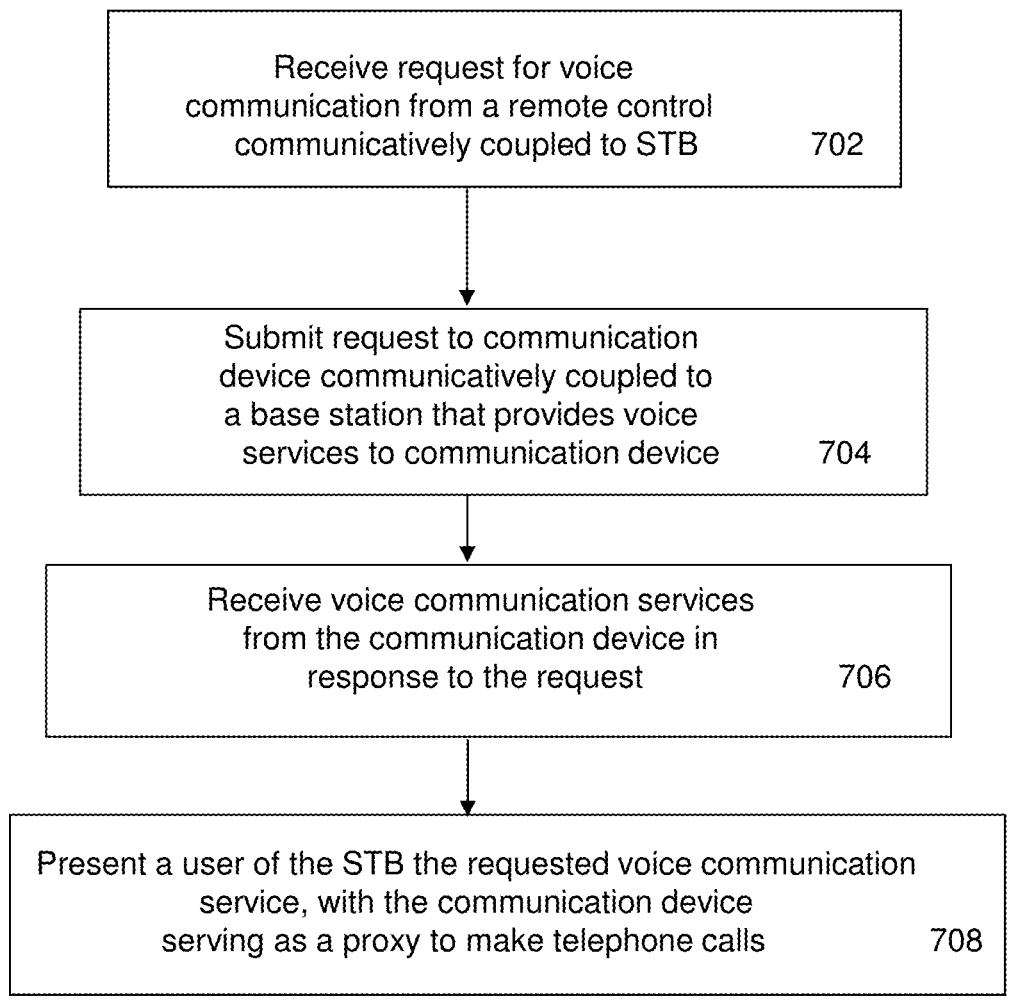
FIG. 7 depicts an illustrative embodiment of a method operating in portions of the communication systems of FIGS. 1-2.

The method 700 of operation shown in FIG. 7 will now be described in connection with the system of FIG. 5. First, at step 702 a request is received for voice communication by a user using, for example, the remote control device 107 which is communicatively coupled to the STB 106. In this case, the user may be enjoying a television program on presentation device 108, for example, a flat screen TV. The user then decides to make a telephone call using the remote control device 107. The remote control may comprise a low-volume speaker 514 and a microphone 516 for holding the remote control device to the user's ear and mouth, respectively, and serve as a cordless handset. As an example, the voice communication request from the user through the STB 106 may comprise a phone number selection.

In step 704, the request from the STB 106 is submitted to the communication device 502 which is communicatively couple to the base station 506 by way of DECT and WiFi. The base station 506 provides voice services to the communication device 502.

In step 706, the STB 106 receives voice communication services from the communication device 502 via the base station 506 in response to the request. In this regard, the communication device 502 can provide such services as, but not limited to, a contact/address book for presentation and selection of an item, caller identification, news, weather, sports, the Yellow Pages, etc.

In step 708, the user of the STB 106 is presented the requested voice communication service for presentation on, for example, his TV. Thus, for example, if the user has requested a contact book, he can then choose a particular phone number appearing on his TV screen, highlight the same using the remote control device 107, and then initiate a telephone call by, for example, pressing a designated button or key on the remote control device 107. With such a configuration, the communication device 502 serves as a proxy to make telephone calls on behalf of the STB 106. As noted above, information that is normally presented, for example, on the touch-sensitive display of the communication device 502, can also be presented to the user of the STB 106 on the presentation device 108 such as a television set.

The method of operation would be basically the same for the system 600 shown in FIG. 6 except that communication device in the form of the tablet or frame 502 used in the system 500 of FIG. 5 is eliminated such that the base station 606 also performs the functions of the communication device including providing such services as, but not limited to, a contact/address book for presentation and selection of an item, caller identification, news, weather, sports, the Yellow Pages, etc.

The present invention further contemplates a user interface, either disposed directly on the STB 106 or using the presentation device 108 such as the TV screen, in order to indicate to the user when the communicative device is currently in use by another user, and notifies the user when the communicative device is available for use by the user. For example, a message may be displayed on, for example, the TV screen and/or the STB user interface that indicates that the phone is currently in use by another user and that the user will be notified when the phone is available for use by the user. In this way, the STB 106 can be used to queue outgoing calls from, for example, different family members. Moreover, if the communicative device comprises a landline phone, and wherein when a phone line of the landline phone is not being used by the other user, the STB 106 may transmit call information to the landline phone such that the landline phone or the presentation device rings with a distinctive ring reserved for outgoing calls initiated by the user using the remote control device 107.

Upon reviewing the aforementioned embodiments, it would be evident to an artisan with ordinary skill in the art that said embodiments can be modified, reduced, or enhanced without departing from the scope and spirit of the claims described below. For example, while the remote control device 107 is described above as including a speaker and a microphone, the STB 106 itself can include the speaker and microphone to allow the user to make a phone call directly from the STB.

Other suitable modifications can be applied to the present disclosure without departing from the scope of the claims below. Accordingly, the reader is directed to the claims section for a fuller understanding of the breadth and scope of the present disclosure.

Figure 8:
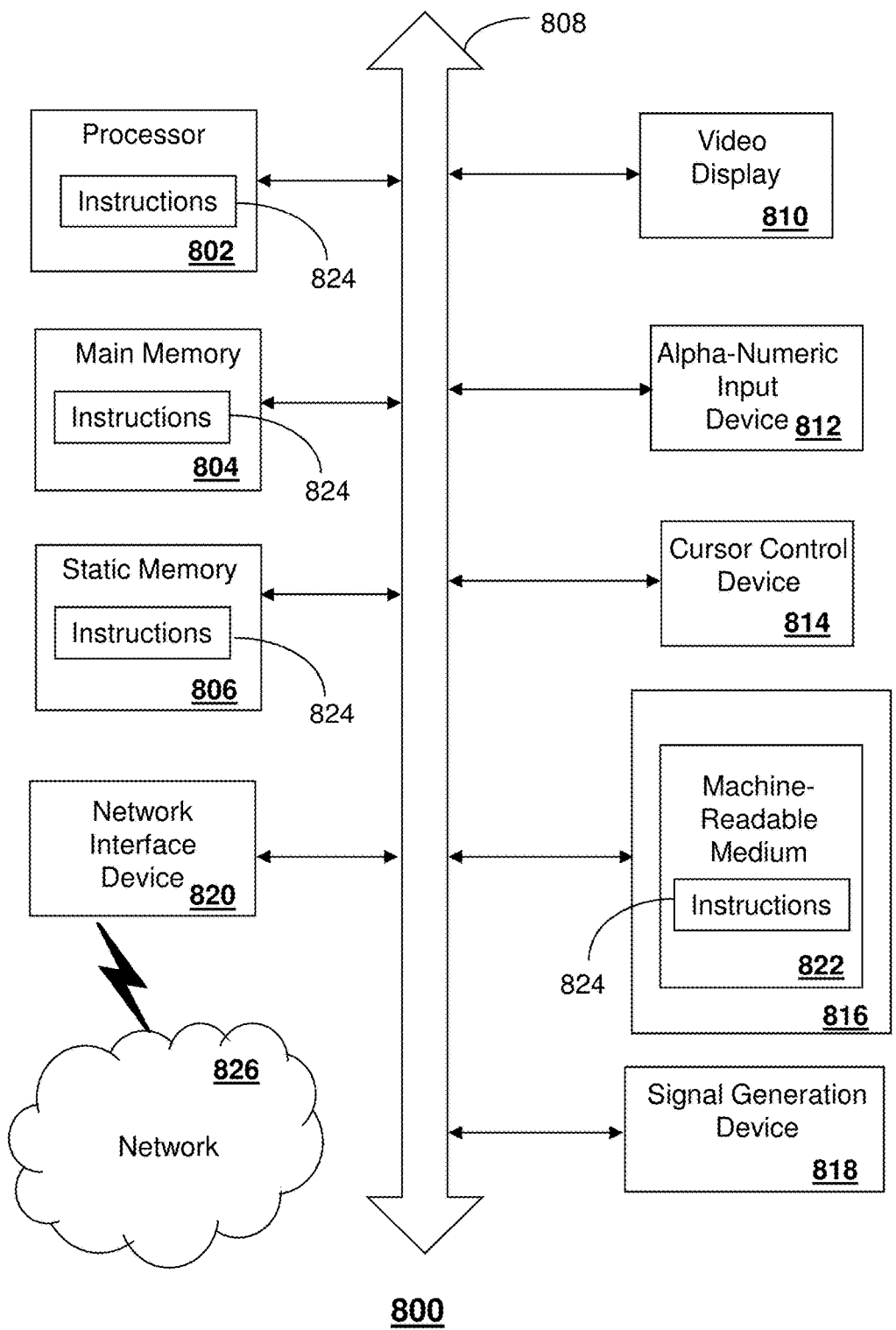
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
      submitting a request for voice communication services through a first communication device of a plurality of communication devices responsive to receiving an input from a requesting communication device requesting use of the voice communication services from the first communication device, wherein the plurality of communication devices are wirelessly coupled to a base station that provides the voice communication services to the plurality of communication devices, and wherein the first communication device serves as a proxy to provide the voice communication services to the requesting communication device via the base station;
      receiving a response from the first communication device, wherein the response comprises an indication that the first communication device is currently being used or is available to provide the voice communication services; and
      responsive to the receiving the response indicating that the first communication device is available to provide the voice communication services:
         submitting a start communication instruction to the first communication device to obtain access to the voice communication services through the first communication device; and
         providing the access to the voice communication services to the requesting communication device.

2. The device of claim 1, wherein responsive to the receiving the response indicating that the first communication device is currently being used, presenting an indication that the first communication device is unavailable at a display device.

3. The device of claim 2, wherein the display device comprises one of a computer, a mobile phone, and a television set.

4. The device of claim 1, wherein the base station is communicatively coupled to a modem that is communicatively coupled to a communication system.

5. The device of claim 4, wherein the modem enables the base station to provide voice communication services to the plurality of communication devices.

6. The device of claim 1, further comprising a data modem coupled to the base station to provide the voice communication services by way of the plurality of communication devices and the base station.

7. The device of claim 1, wherein the first communication device initiates a voice communication request responsive to a phone number entry.

8. The device of claim 1, wherein the first communication device provides a caller identification for presentation at a presentation device.

9. The device of claim 1, wherein the first communication device provides a contact book with selectable items for presentation at a presentation device.

10. The device of claim 1, wherein the first communication device comprises a tablet with a touch-sensitive display.

11. The device of claim 1, wherein the requesting communication device comprises a remote control device that provides instructions to the device.

12. A method, comprising:
receiving, by a processing system comprising a processor, a request for voice communication services from a requesting communication device through a first communication device of a plurality of communication devices, wherein the plurality of communication devices are wirelessly coupled to a base station that provides the voice communication services to the plurality of communication devices, and wherein the first communication device serves as a proxy to provide the voice communication services to the requesting communication device via the base station;
providing, by the processing system, a response from the first communication device indicating that the first communication device is unavailable or is available to provide the voice communication services; and
responsive to the providing the response indicating that the first communication device is available to provide the voice communication services:
submitting, by the processing system, a start communication instruction to the first communication device to obtain access to the voice communication services through the first communication device; and
providing, by the processing system, the access to the voice communication services to the requesting communication device.

13. The method of claim 12, wherein responsive to the providing the response indicating that the first communication device is unavailable, obtaining an indication that the first communication device is unavailable for display at a display device.

14. The method of claim 12, wherein the first communication device comprises a remote control for a media processor.

15. The method of claim 12, wherein the requesting communication device comprises a remote control device that provides instructions to the device.

16. The method of claim 12, wherein the first communication device provides a contact book with selectable items for presentation at a presentation device.

17. A machine-readable storage device, comprising executable instructions that, when executed by a processing system including a processor, facilitate performance of operations, comprising:
routing a request for voice communication services from a requesting communication device through a first communication device of a plurality of communication devices, wherein the plurality of communication devices are wirelessly coupled to a base station that provides the voice communication services to the plurality of communication devices;
responsive to receiving a response indicating that the first communication device is available to provide the voice communication services:
submitting a start communication instruction to the first communication device to obtain access to the voice communication services through the first communication device; and
providing the access to the voice communication services to the requesting communication device; and
responsive to receiving a response indicating that the first communication device is unavailable to provide the voice communication services, presenting an indication that the first communication device is unavailable at a display device.

18. The machine-readable storage device of claim 17, wherein the first communication device comprises a remote control device for a media processor.

19. The machine-readable storage device of claim 18, wherein the media processor provides the voice communication services from the base station to the remote control device, and
wherein the first communication device serves as a proxy to provide the voice communication services to the requesting communication device via the base station.

20. The machine-readable storage device of claim 17, wherein the base station is communicatively coupled to a modem that is communicatively coupled to a communication system.

* * * * *